US012482222B2

(12) United States Patent
Ollila et al.

(10) Patent No.: US 12,482,222 B2
(45) Date of Patent: Nov. 25, 2025

(54) CORRECTING IMAGES CAPTURED WITH METALENSES USING DIFFERENT ILLUMINATION CHARACTERISTICS

(71) Applicant: Varjo Technologies Oy, Helsinki (FI)

(72) Inventors: Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 335 days.

(21) Appl. No.: 18/315,569

(22) Filed: May 11, 2023

(65) Prior Publication Data

US 2024/0378848 A1    Nov. 14, 2024

(51) Int. Cl.
| | |
|---|---|
| *G06V 10/60* | (2022.01) |
| *G06T 5/70* | (2024.01) |
| *G06T 5/80* | (2024.01) |
| *G06V 10/143* | (2022.01) |
| *G06V 10/74* | (2022.01) |
| *G06V 10/75* | (2022.01) |
| *G06V 10/82* | (2022.01) |

(52) U.S. Cl.
CPC ............... *G06V 10/60* (2022.01); *G06T 5/70* (2024.01); *G06T 5/80* (2024.01); *G06V 10/143* (2022.01); *G06V 10/751* (2022.01); *G06V 10/761* (2022.01); *G06V 10/82* (2022.01)

(58) Field of Classification Search
CPC .... G06V 10/60; G06V 10/143; G06V 10/751; G06V 10/761; G06V 10/82; G06T 5/70; G06T 5/80; H04N 23/56
See application file for complete search history.

(56) References Cited

U.S. PATENT DOCUMENTS

| 10,437,012 B1* | 10/2019 | Gurin | G02F 1/15 |
|---|---|---|---|
| 2019/0361222 A1* | 11/2019 | Gurin | G03B 17/00 |
| 2020/0193581 A1* | 6/2020 | Derakhshani | G06T 5/77 |
| 2021/0037219 A1* | 2/2021 | Colburn | G02B 5/1871 |
| 2021/0389599 A1* | 12/2021 | Wang | G02B 27/0081 |
| 2022/0086372 A1* | 3/2022 | Menon | H04N 25/76 |
| 2023/0080390 A1* | 3/2023 | Gurin | G02B 3/08 |
| | | | 348/344 |
| 2023/0292016 A1* | 9/2023 | Zhu | H04N 13/232 |
| 2023/0392986 A1* | 12/2023 | Allen | G01S 7/4815 |

(Continued)

*Primary Examiner* — Aaron W Carter
(74) *Attorney, Agent, or Firm* — ZIEGLER IP LAW GROUP, LLC.

(57) ABSTRACT

An imaging system includes a controllable light source; an image sensor; metalens for focusing incoming light onto the image sensor; and processor(s). The processor(s) is configured to control a light source using a first illumination intensity and/or first illumination wavelength, while controlling the image sensor to capture first image; control the light source using a second illumination intensity and/or second illumination wavelength, while controlling the image sensor to capture a second image; calculate measured differences between pixel values of pixels in the first image and pixel values of corresponding pixels in the second image; estimate expected pixel value differences based on difference between the first and second illumination intensities and/or differences between the first and second illumination wavelengths; and correct pixel values of pixels in the first image and/or second image based on deviation in measured differences from expected differences.

14 Claims, 5 Drawing Sheets

(56) References Cited

U.S. PATENT DOCUMENTS

| | | | |
|---|---|---|---|
| 2024/0288307 A1* | 8/2024 | Levy | G01J 3/26 |
| 2024/0365011 A1* | 10/2024 | Ollila | H04N 23/74 |
| 2024/0378848 A1* | 11/2024 | Ollila | G06T 5/70 |
| 2025/0200776 A1* | 6/2025 | Ollila | H04N 13/239 |

* cited by examiner

CONTROL CONTROLLABLE LIGHT SOURCE FOR ILLUMINATING FIELD OF VIEW OF IMAGE SENSOR USING AT LEAST ONE OF: FIRST ILLUMINATION INTENSITY, FIRST ILLUMINATION WAVELENGTH, WHILST CONTROL IMAGE SENSOR TO CAPTURE FIRST IMAGE
502

CONTROL CONTROLLABLE LIGHT SOURCE FOR ILLUMINATING FIELD OF VIEW OF IMAGE SENSOR USING AT LEAST ONE OF: SECOND ILLUMINATION INTENSITY, SECOND ILLUMINATION WAVELENGTH, WHILST CONTROL IMAGE SENSOR TO CAPTURE SECOND IMAGE
504

CALCULATE MEASURED DIFFERENCES BETWEEN PIXEL VALUES OF PIXELS IN FIRST IMAGE AND PIXEL VALUES OF CORRESPONDING PIXELS IN SECOND IMAGE
506

ESTIMATE EXPECTED DIFFERENCES IN PIXEL VALUES BETWEEN FIRST IMAGE AND SECOND IMAGE
508

CORRECT PIXEL VALUES OF PIXELS IN AT LEAST ONE OF: FIRST IMAGE, SECOND IMAGE
510

FIG. 5

CORRECTING IMAGES CAPTURED WITH METALENSES USING DIFFERENT ILLUMINATION CHARACTERISTICS

TECHNICAL FIELD

The present disclosure relates to imaging systems incorporating correction of images captured with metalenses, using different illumination characteristics. The present disclosure also relates to methods incorporating correction of images captured with metalenses using different illumination characteristics.

BACKGROUND

Presently, metalenses are counted amongst top emerging technologies. These metalenses employ metasurfaces having nanostructures to focus light. Typically, the nanostructures are smaller than a wavelength of the light that is to be focused. Metalenses have flat surfaces and a thin design, thereby allowing for their use in a variety of optical systems. Metalenses enable miniaturization and simplification of optics. Currently, metalenses are suitable for focusing monochromatic light (i.e., narrowband light).

Figure 1A:
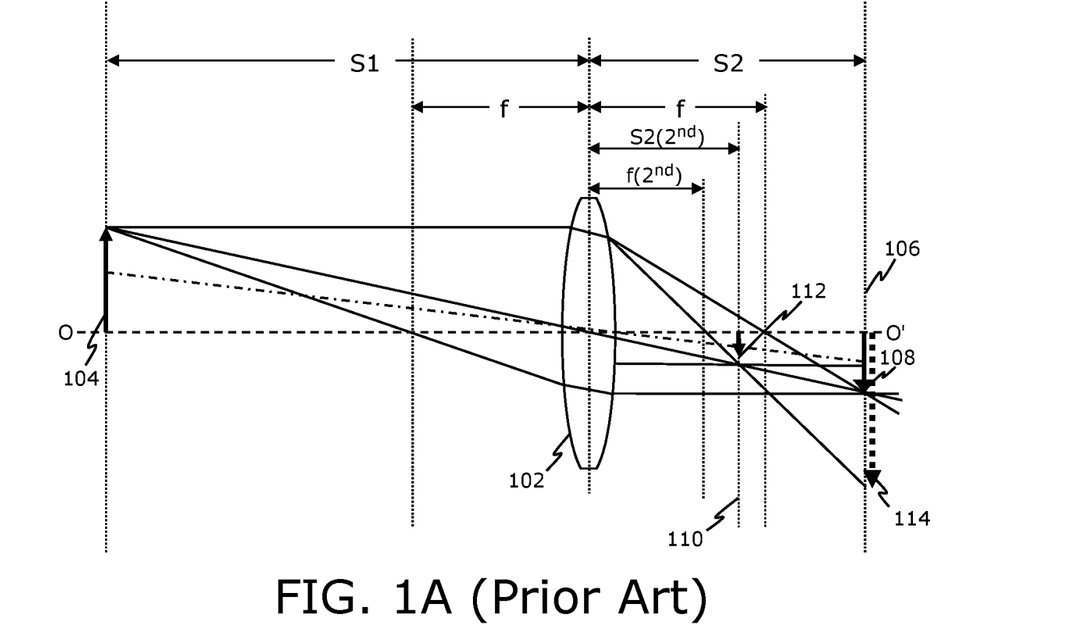
FIG. 1A (Prior Art) illustrates a ray diagram of how a metalens focuses light onto an image sensor, while FIG. 1B (Prior Art) illustrates a ray diagram of how the metalens focuses light from different objects arranged at different optical depths, onto the image sensor.
Figure 1B:
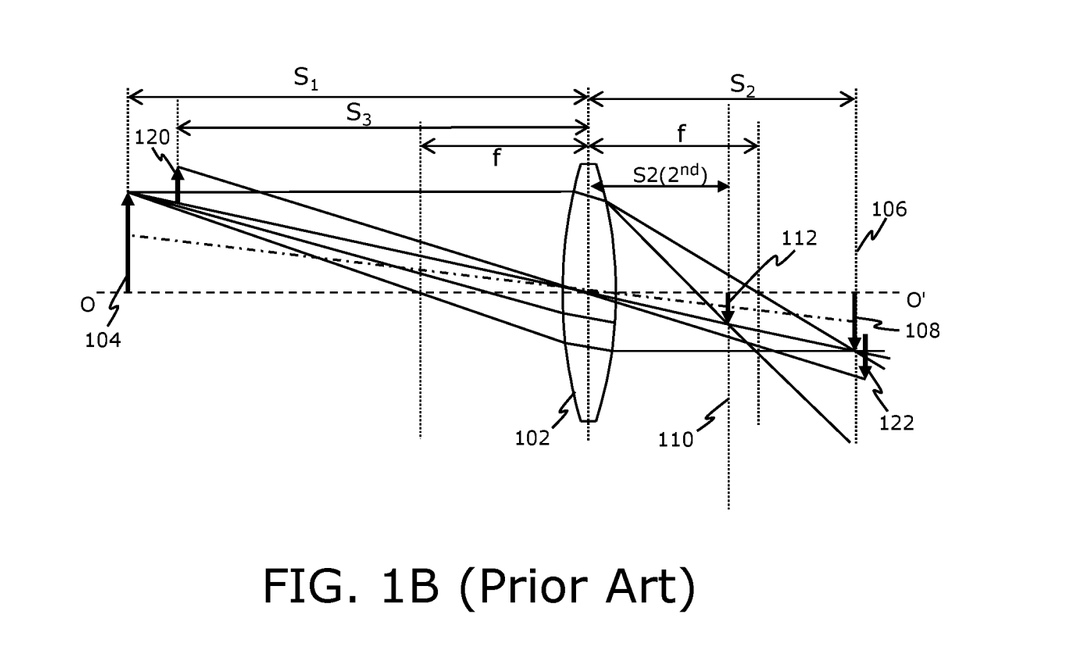

FIG. 1A (Prior Art) is a ray diagram illustrating how a metalens focuses light onto an image sensor, while FIG. 1B (Prior Art) is a ray diagram illustrating how the metalens focuses light from different objects arranged at different optical depths, onto the image sensor. Referring to FIGS. 1A (Prior Art) and 1B (Prior Art), the ray diagrams illustrate how a metalens 102 focuses light onto an image sensor (not shown). An object 104 from which the light is directed towards the metalens 102, is shown to be arranged at a distance S1 from the metalens 102. An image plane 106 of the image sensor is shown, for sake of simplicity. The image sensor is arranged at a distance S2 from the metalens 102, at a side that is opposite to a side at which the object 104 is placed with respect to the metalens 102. An optical axis of the metalens 102 is shown as a dashed line O-O'. In FIGS. 1A and 1B, a first order focal length f of the metalens 102 focuses the light correctly on the image plane 106 of the image sensor and thus enables formation of a real image 108 (shown as a solid arrow) of the object 104 at the image sensor. A second order parasitic focal length f(2nd) of the metalens 102 focuses the light at another plane 110 that lies between the metalens 102 and the plane 106 of the image sensor, thereby forming a real image 112 of the object 104 at the another plane 110. In other words, the 2nd order parasitic focal length f(2nd) focuses the light before the image plane 106 of the image sensor. The another plane 110 lies at a distance S2(2nd) from the metalens 102 (and at a distance S2-S2(2nd) from the image plane 106 of the image sensor).

In FIG. 1A, it is shown that due to the 2nd order parasitic focal length f(2nd), the light (that was focused at the another plane 110), upon reaching the image plane 106, does not create any focused image of the object 104, but in fact produces unfocused light 114 (shown as a square-dot arrow) whose intensity spreads from a centre of the image sensor towards a corner of the image sensor. Moreover, some part of the light from the object 104 may not even reach the image sensor.

In FIG. 1B, another object 120 from which the light is directed towards the metalens 102, is shown to be arranged at a distance S3 from the metalens 102. The first order focal length f of the metalens 102 focuses the light correctly on the image plane 106 of the image sensor and thus enables formation of a real image 122 (shown as a solid arrow) of the object 120 at the image sensor. Now when FIG. 1A is considered along with FIG. 1B, it is clear that the unfocused light 114 on the plane 106 would adversely affect the real image 122 of the object 120.

Therefore, it is clear from FIGS. 1A and 1B that metalenses have some focusing problems associated therewith. From amongst an entirety of light that is incident upon a metalens, 0th order light passes through the metalens without refraction, 1st order light is properly focused sharply (as required) by the metalens on the image plane of the image sensor, and 2nd order light results into unfocused light on the image plane of the image sensor. In images captured using an imaging system in which an image sensor is arranged along a focal plane of a metalens, the 2nd order of light appears as a bright spot, which is an undesirable visual artifact. This bright spot is typically at a centre of the image sensor, and its intensity may reduce on going from the centre towards edges of the image sensor. As an example, tens of percent of the total incoming light may be captured as the bright spot of the 2nd order light. Moreover, some parts of the 2nd order light may not even be captured in such images, since the 2nd order light may spread beyond the image sensor. Furthermore, metalenses are unsuitable for imaging objects arranged at different optical depths, as unfocused light from one or more objects arranged at one optical depth often adversely affects image formation of other objects arranged at other optical depths. As a result, images of the other objects have poor image quality. Therefore, the images captured using the metalenses have poor quality.

Therefore, in the light of the foregoing discussion, there exists a need to overcome the aforementioned drawbacks associated with focusing problems of metalenses.

SUMMARY

The present disclosure seeks to provide an imaging system incorporating correction of images captured with metalenses using different illumination characteristics. The present disclosure also seeks to provide a method incorporating correction of images captured with metalenses using different illumination characteristics. An aim of the present disclosure is to provide a solution that overcomes at least partially the problems encountered in prior art.

In a first aspect, an embodiment of the present disclosure provides an imaging system comprising:
   a controllable light source;
   an image sensor;
   a metalens that is to be employed to focus incoming light onto the image sensor; and
   at least one processor configured to:
      control the controllable light source to illuminate a field of view of the image sensor using at least one of: a first illumination intensity, a first illumination wavelength, whilst controlling the image sensor to capture a first image;
      control the controllable light source to illuminate the field of view of the image sensor using at least one of: a second illumination intensity, a second illumination wavelength, whilst controlling the image sensor to capture a second image;
      calculate measured differences between pixel values of pixels in the first image and pixel values of corresponding pixels in the second image;
      estimate expected differences in the pixel values between the first image and the second image, based on at least one of: a difference between the first illumination intensity and the second illumination intensity, a difference between the first illumination wavelength and the second illumination wavelength; and correct the pixel values of the pixels in at least one of: the first image, the second image, based on a deviation in the measured differences from the expected differences in the pixel values.

In a second aspect, an embodiment of the present disclosure provides a method for imaging, the method being implemented by an imaging system comprising a controllable light source, an image sensor, and a metalens that is to be employed to focus incoming light onto the image sensor, the method comprising:

controlling the controllable light source for illuminating a field of view of the image sensor using at least one of: a first illumination intensity, a first illumination wavelength, whilst controlling the image sensor to capture a first image;

controlling the controllable light source for illuminating the field of view of the image sensor using at least one of: a second illumination intensity, a second illumination wavelength, whilst controlling the image sensor to capture a second image;

calculating measured differences between pixel values of pixels in the first image and pixel values of corresponding pixels in the second image;

estimating expected differences in the pixel values between the first image and the second image, based on at least one of: a difference between the first illumination intensity and the second illumination intensity, a difference between the first illumination wavelength and the second illumination wavelength; and correcting the pixel values of the pixels in at least one of: the first image, the second image, based on a deviation in the measured differences from the expected differences in the pixel values.

Embodiments of the present disclosure substantially eliminate or at least partially address the aforementioned problems in the prior art, and enable correction of at least one of: the first image, the second image to generate high-quality images with error compensation for visual artifacts generated due to 2nd order light from metalenses, thereby enabling use of such metalenses in a variety of imaging systems for imaging objects at different optical depths, for imaging in different illumination conditions, and similar.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3A illustrates an exemplary graphical representation relating to capturing of phase images by an image sensor, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:

a controllable light source;

an image sensor;

a metalens that is to be employed to focus incoming light onto the image sensor; and at least one processor configured to:

control the controllable light source to illuminate a field of view of the image sensor using at least one of: a first illumination intensity, a first illumination wavelength, whilst controlling the image sensor to capture a first image;

control the controllable light source to illuminate the field of view of the image sensor using at least one of: a second illumination intensity, a second illumination wavelength, whilst controlling the image sensor to capture a second image;

calculate measured differences between pixel values of pixels in the first image and pixel values of corresponding pixels in the second image;

estimate expected differences in the pixel values between the first image and the second image, based on at least one of: a difference between the first illumination intensity and the second illumination intensity, a difference between the first illumination wavelength and the second illumination wavelength; and correct the pixel values of the pixels in at least one of: the first image, the second image, based on a deviation in the measured differences from the expected differences in the pixel values.

In a second aspect, an embodiment of the present disclosure provides a method for imaging, the method being implemented by an imaging system comprising a controllable light source, an image sensor, and a metalens that is to be employed to focus incoming light onto the image sensor, the method comprising:

controlling the controllable light source for illuminating a field of view of the image sensor using at least one of: a first illumination intensity, a first illumination wavelength, whilst controlling the image sensor to capture a first image;

controlling the controllable light source for illuminating the field of view of the image sensor using at least one of: a second illumination intensity, a second illumination wavelength, whilst controlling the image sensor to capture a second image;

calculating measured differences between pixel values of pixels in the first image and pixel values of corresponding pixels in the second image;

estimating expected differences in the pixel values between the first image and the second image, based on at least one of: a difference between the first illumination intensity and the second illumination intensity, a difference between the first illumination wavelength and the second illumination wavelength; and correcting the pixel values of the pixels in at least one of: the first image, the second image, based on a deviation in the measured differences from the expected differences in the pixel values.

The present disclosure provides the aforementioned imaging system and the aforementioned method for imaging incorporating correction of images captured with metalenses using different illumination characteristics (namely, different illumination intensities and/or different illumination wavelengths). The imaging system employs the metalens for achieving benefits such as simple and compact optics, and cost-efficiency, whilst also effectively compensating for a visual artifact generated at the image sensor by the metalens due to 2nd order light. By controlling the controllable light source to provide different illumination conditions (namely, different illumination intensities and/or different illumination wavelengths) to illuminate the field of view of the image sensor, the measured differences (i.e., an actual change) between the pixel values in the first image and the second image is easily and accurately calculated, which is further used to correct the pixel values representing the 2nd order light in the at least one of: the first image, the second image. The image correction described herein beneficially also takes into account the expected differences (i.e., an expected change) in the pixel values between the first image and the second image; the expected differences are also estimated based on the different illumination conditions employed (namely, different illumination intensities and/or different illumination wavelengths). The deviation in the measured differences from the expected differences is indicative of a contribution of the 2nd order light (namely, a parasitic light) at each pixel in the at least one of: the first image, the second image. This is due to a fact that the 1st order light and the 2nd order light (namely, the parasitic light) react differently to changes in the illumination conditions. Thus, the deviation between the measured difference and the expected difference, which accounts for any unexpected change in the pixel values with change in the illumination conditions, is used as a basis for image correction. As a result, after correction, the at least one of: the first image, the second image, has nil or minimal effect of the 2nd order light. This means that the corrected at least one of: the first image, the second image is sharp, clear, artifact-compensated, and has a high quality. Such corrected images are beneficially usable for various applications (for example, such as extended-reality applications) involving high-quality images. Beneficially, due to such effective compensation of focusing inefficiencies of metalenses, the metalenses can now advantageously be used in current and upcoming cameras (for example, such as in time-of-flight (TOF) cameras, etc.). Advantageously, existing equipment could be used for implementing the imaging system. The method described herein is simple, effective, reliable, and easy to implement.

The term "imaging system" refers to a system for imaging a real-world environment. The imaging system may be used for imaging real-world environments for a variety of applications including but not limited to extended-reality (XR), inspection of the real-world environment, machine vision, gaming, art, and so forth. Notably, the imaging system is a specialized equipment for capturing a given image (namely, the first image and/or the second image) and also correcting the given image for metalens-based visual artefacts. It will be appreciated that the imaging system corrects the given image in real time or near-real time. Then, the given image which is corrected is optionally communicated from the imaging system to at least one display apparatus. The given image which is corrected is optionally to be presented to a user of the at least one display apparatus.

Hereinabove, the "display apparatus" is a specialized equipment that is capable of at least displaying the given image which is corrected. Optionally, the display apparatus is implemented as a head-mounted display (HMD). The term "head-mounted display" refers to a specialized equipment that is configured to present an XR environment to the user when said HMD, in operation, is worn by the user on his/her head. The HMD is implemented, for example, as an XR headset, a pair of XR glasses, and the like, that is operable to display a visual scene of the XR environment to the user. Optionally, in this regard, the given image is an XR image. The term "extended-reality" encompasses virtual reality (VR), augmented reality (AR), mixed reality (MR), and the like.

In some implementations, the imaging system is integrated with the display apparatus. In such implementations, the imaging system is physically coupled to the display apparatus (for example, attached via mechanical and/or electrical connections to components of the display apparatus). For example, at least one controllable light source and at least one image sensor per eye may be arranged on an outer surface of the display apparatus that faces the real-world environment. Optionally, in such implementations, the at least one processor of the imaging system serves as at least one processor of the display apparatus. Alternatively, optionally, in such implementations, the at least one processor of the imaging system is communicably coupled to at least one processor of the display apparatus.

In other implementations, the imaging system is implemented on a remote device that is separate from the display apparatus. In such implementations, the at least one processor of the imaging system and the at least one processor of the display apparatus are optionally communicably coupled, wirelessly and/or in a wired manner. Optionally, the imaging system is mounted on the remote device. Examples of the remote device include, but are not limited to, a drone, a vehicle, a robot, and a teleport device. Optionally, the remote device is physically positioned at the real-world environment, whereas the user of the display apparatus is positioned away from (for example, at a distance from or at a different geographical location than) the remote device.

Throughout the present disclosure, the term "controllable light source" refers to an element from which light emanates. The controllable light source is controllable (for example, using electrical signals) to dynamically adjust illumination characteristics of the light emitted therefrom. In other words, the controllable light source supports dynamic illumination of an entirety of the field of view of the image sensor. The controllable light source supports at least two different ways of illuminating the field of view. This enables dynamic lighting conditions to be produced in the field of view. Optionally, the controllable light source emits light in at least one of: an infrared spectrum, a visible-light spectrum. A technical benefit of employing a controllable light source that emits light in the infrared spectrum is that such light is imperceptible to the user, has a long range which is useful for distance measurement using the imaging system, and is less affected by ambient light (as compared to light in the visible-light spectrum). Optionally, the controllable light source emits narrow-band light. As an example, the controllable light source may emit light in a narrow band of 10 nanometre (nm), which is suitable for use with a time-of-flight camera. It will be appreciated that the controllable light source is arranged in the imaging system in a manner that it is capable of illuminating the entirety of the field of view of the image sensor.

Optionally, the controllable light source comprises at least one light-emitting element, the at least one light emitting-element comprises at least one of: a light emitting diode, a laser diode, a projector, a flash lamp, a pulsed incandescent light source, an infrared light-emitting diode. In this regard, the controllable light source is an active light source. This means the controllable light source provides the light by emitting the light itself.

Throughout the present disclosure, the term "image sensor" refers to a device which detects light from a real-world environment at its photo-sensitive surface, when said light is incident thereupon. The image sensor comprises a plurality of photo-sensitive elements, which collectively form the photo-sensitive surface of the image sensor. Upon such detection of the light from the real-world environment, the plurality of photo-sensitive elements capture a plurality of image signals. The plurality of image signals are electrical signals pertaining to a real-world scene of the real-world environment. The plurality of image signals are processed (by an image signal processor or the at least one processor of the imaging system) to generate a digital image. A given photo-sensitive element is known as a picture element, or a pixel. It will be appreciated that the plurality of photo-sensitive elements could be arranged in various ways (for example, such as a rectangular two-dimensional (2D) grid, a polygonal arrangement, a circular arrangement, an elliptical arrangement, a freeform arrangement, and similar) to form the photo-sensitive surface of the image sensor. Examples of the image sensor may include, but are not limited to, a charge-coupled device (CCD) image sensor, and a complementary metal-oxide-semiconductor (CMOS) image sensor.

Throughout the present disclosure, the term "field of view" of the image sensor refers to an observable extent of the real-world environment that is captured by the image sensor. The field of view of the image sensor is expressed in terms of degrees or radians. The field of view of the image sensor may depend on the size of the image sensor. Optionally, the field of view of the image sensor is greater than 50 degrees. As an example, the field of view of the image sensor may be 50, 60, 70, 80, 90, 100, 110, 120, 130, 140, 150, 160, 170, 180, 190, 200, 210, 220 degrees, and so forth. It will be appreciated that since the metalens is flat, a maximum angle at which it receives the incoming light is typically less than 180 degrees. However, with additional optical elements arranged on top of the metalens (i.e., on and/or in proximity of a metasurface of the metalens), the metalens could receive the incoming light from larger angles (namely, larger than 180 degrees).

Optionally, the controllable light source, the image sensor and the metalens constitute a metalens-based time-of-flight (TOF) camera. In this regard, the imaging system comprises the metalens-based TOF camera and the at least one processor (which may be implemented either in the metalens-based TOF camera, or external to the metalens-based TOF camera). Optionally, the metalens-based TOF camera further comprises a timing circuit configured to measure a time taken for the light to travel from the controllable light source to objects or their portions in the real-world environment and back from the objects to the image sensor via the metalens, wherein the at least one processor is further configured to determine optical depths of the objects or their portions from the metalens-based TOF camera, based on said time. The metalens-based TOF camera beneficially provides the advantages of metalens-based imaging such as simple and compact optics design, cost efficiency, and similar, whilst also providing an added advantage of having the capability of correcting captured images for compensation of visual artefacts generated due to the 2nd order light.

Optionally, the imaging system further comprises a light filter arranged with respect to the image sensor in a manner that the light incident upon the image sensor passes through the light filter and is then detected at the photo-sensitive surface of the image sensor. In an embodiment, the light filter is implemented as an IR and/or NIR wavelength filter. The IR and/or NIR wavelength filter can be tuned to filter different IR and/or NIR wavelengths, for example, such as 850 nm, 905 nm, 940 nm, 1060 nm, and similar, which can be understood to be distinct light bands of a non-visible light spectrum. In another embodiment, the light filter is implemented as a colour filter array (CFA). Optionally, the CFA is a Bayer CFA. As an example, the Bayer CFA could be one of: a 4C Bayer CFA, a 9C Bayer CFA, a 16C Bayer CFA. It will be appreciated that the CFA could alternatively be other than the Bayer CFA.

Optionally, the at least one processor is further configured to process a plurality of images captured by the metalens-based TOF camera to generate a depth map. In this regard, the term "depth map" refers to a data structure comprising information pertaining to the optical depths of the objects or their portions present in the real-world environment. Optionally, the depth map is an image comprising a plurality of pixels, wherein a pixel value of each pixel indicates optical depth of its corresponding real point/region within the real-world environment.

Throughout the present disclosure, the term "metalens" refers to an optical element that uses a metasurface to focus the incoming light, the metasurface being a surface having nanostructures (i.e., sub-wavelength structures) arranged thereon. These nanostructures work as optical antennas and manipulate the incoming light at nanoscale, by capturing and directing the incoming light in a way that is similar to how metal antennas work with radio waves. The nanostructures may be arranged in the form of an array (for example, a quasiperiodic array) on the metasurface. The nanostructures are designed to be smaller than a wavelength of the incoming light that is to be focused. Optionally, the metasurface is a flat surface. Optionally, the metalens has telecentric optics. The metalens is made of materials comprising at least one of: metals, dielectrics. Optionally, the metalens is one of: a plasmonic metalens, a dielectric metalens. These types of metalenses have material compositions that are different from each other. It will be appreciated that the metalens is beneficially much thinner and lighter than traditional lenses, thereby enabling simple and cost-effective lens designs.

Optionally, in the imaging system, the image sensor and the metalens are arranged along an axis in a manner that the axis passes through an optical centre of the image sensor and through an optical centre of the metalens. In other words, the image sensor and the metalens are aligned optical-centrally with each other. The aforesaid axis may be considered as an optical axis of the imaging system.

Optionally, when the image sensor is symmetrical with respect to its optical axis, the optical centre of the image sensor corresponds to a centre of the image sensor. Similarly, optionally, when the metalens is symmetrical with respect to its optical axis, the optical centre of the metalens corresponds to a centre of the metalens. It will be appreciated that alternatively, the optical centre of the image sensor and/or the metalens may not correspond to the centre of the image sensor and/or the metalens, respectively.

It will be appreciated that the at least one processor is coupled to the controllable light source and the image sensor. The at least one processor is implemented as hardware, software, firmware, or a combination of these. The at least one processor is configured to control operation of the controllable light source and the image sensor, and also process the plurality of image signals captured by corresponding pixels of the image sensor to generate the given image. The at least one processor could be implemented as any one of: a microprocessor, a microcontroller, or a controller. As an example, the at least one processor could be implemented as an application-specific integrated circuit (AISC) chip or a reduced instruction set computer (RISC) chip.

Optionally, the at least one processor is configured to control the controllable light source at a first time instant using a first drive signal for enabling capturing of the first image, and to control the controllable light source at a second time instant using a second drive signal for enabling capturing of the second image, wherein the first time instant is different from the second time instant. In this regard, a given drive signal (namely, the first drive signal and/or the second drive signal) controls the controllable light source to emit light at a given illumination intensity and/or at a given illumination wavelength, to illuminate the field of view of the image sensor. The given drive signal could be a current signal, a voltage signal, or similar. Herein, the term "illumination intensity" refers to an amount of energy transmitted per unit area per unit of time, by the light emitted by the controllable light source. The given illumination intensity is also related to brightness such that higher the given illumination intensity employed when capturing the given image, brighter is the given image, and vice versa. The term "illumination wavelength" refers to a wavelength of the light emitted by the controllable light source. When the light belongs to the visible-light spectrum, the illumination wavelength is also indicative of a colour of the light.

In some implementations, the first illumination intensity is different from the second illumination intensity. In such implementations, the first illumination wavelength may be same as or different from the second illumination wavelength. In other implementations, the first illumination wavelength is different from the second illumination wavelength. In such implementations, the first illumination intensity may be same as or different from the second illumination intensity. In this way, at least one illumination condition from amongst the illumination intensity and the illumination wavelength is changed between capturing of the first image and the second image.

The at least one processor is configured to readout image signals from the image sensor in a time-synchronized manner with respect to controlling of the controllable light source. The image sensor is controlled such that when the controllable light source illuminates the field of view of the image sensor, the image sensor captures the given image simultaneously, near-simultaneously (i.e., after a miniscule time interval), or similar. Notably, the first image and the second image are captured at different time instants by the image sensor, so that the same field of view can be imaged using different illumination conditions. Optionally, the second image and the first image represent the real-world environment from a same perspective. In this regard, the second image is captured from a same pose of the image sensor which was used to capture the first image. This enables ease of comparison between the first image and the second image, for accurate detection of visual artefacts (for example, such as light spots of 2nd order unfocused light) formed due to focusing properties of the metalens. A technical effect of using different illumination conditions while capturing the first image and the second image is that it enables in identification (and subsequently, correction) of certain visual artifacts which are visible in the at least one of: the first image, the second image, under certain specific illumination conditions.

It will be appreciated that both the first image and the second image are captured from an almost same pose of the image sensor, the at least one processor is configured to optionally perform reprojection from one pose to another pose to shift a position of image features between the first image and the second image, due to any small change in the pose of the image sensor.

Optionally, the first image and the second image are at least one of: phase images, correlation images, depth images. A technical effect of this is that the imaging system can easily be employed in metalens-based TOF cameras that capture such a variety of images, since these various types of images can be corrected using the imaging system. Herein, the term "phase image" refers to an image that is representative of a phase shift between a first light signal and a second light signal, wherein the first light signal is used to illuminate the entirety of the field of view and the second light signal is a reflection of the first light signal from the real-world environment corresponding to the field of view, and wherein the second light signal is detected by the image sensor and processed to generate the phase images. Information indicative of this phase shift constitutes the phase images and is obtained by sampling a cross-correlation of the first light signal with the second light signal. The phase image does not directly indicate optical depths of objects present in the real-world environment. Optionally, the first light signal is a modulated light signal.

The term "depth image" refers to an image which represents optical depth(s) of object(s) or their portions present in the real-world environment. The depth image may also represent visual content of the real-world environment, in addition to the optical depth(s) of the object(s) or their portions. Optionally, the depth image is a two-dimensional (2D) depth image or a 3D depth image. Optionally, the depth images are generated from phase images by processing the phase images using phase unwrapping.

The "correlation images" are intermediate images between the phase images and the depth images. In other words, the correlation images are generated while processing the phase images to generate the depth images, at an intermediate processing step. Optionally, the correlation images are generated using the phase images, wherein one correlation image is generated using two phase images. Furthermore, the correlation image may be an amplitude image, wherein the amplitude image represents correlation between two phase images. For example, there may be nine phase images P1-P9 that may be captured at three frequency modes (i.e., at three different illumination intensities). Herein, three phase images P1, P2, P3 may be captured at a high frequency mode (i.e., at high illumination intensity/ power levels), next three phase images P4, P5, P6 may be captured at a medium frequency mode, and remaining three images P7, P8, P9 may be captured at a low frequency mode. Thereafter, a difference of each phase image with its corresponding phase image at a different frequency mode may be calculated, and said difference may be combined to generate one correlation image. For example, a correlation image C1 may be generated using the phase images P1 and P4, a correlation image C2 may be generates using the phase images P5 and P8, and so on. The correlation image may represent deviation from an ideal image, wherein said deviation is proportional to a difference between the illumination intensities employed for capturing the phase images from which the correlation image is generated.

At least some of the pixels in the first image are different from the corresponding pixels in the second image, due to the different illumination conditions employed for capturing the first image and the second image. Herein, both the first image and the second image represent the objects or their portions in the real-world environment by 0th order light that is not refracted by the metalens, by 1st order light which is light that is properly focused by the metalens at the image sensor, and by 2nd order light (or, a parasitic light component) which is unfocused light received at the image sensor due to second order focusing properties of the metalens. Under the different illumination conditions, a contribution of the 1st order light and the 2nd order light in different images is different, and this causes the pixel values of corresponding pixels in the first image and the second image to be different from each other.

Herein, the term "pixel value" of the pixel refers to a value of the pixel, which encompasses at least one of: a colour value (i.e., an intensity value), a luminance value (for example, such as a hue value, a saturation value, and a lightness value), of the pixel. Optionally, the colour value is one of: a grayscale value, an RGB colour value, an RGB-A colour value, a Cyan-Magenta-Yellow-Black (CMYK) colour value, a high dynamic range (HDR) colour value. The grayscale value may lie in a range of 0-1, 0-100, 0-255 (for 8-bit representations).

Optionally, the pixel values of the pixels in the first image are generated as a resultant combination of a first original light component (i.e., a light component having the at least one of: the first illumination intensity, the first illumination wavelength) and a first parasitic light component (i.e., a first 2nd order light component). Similarly, the pixel values of the pixels in the second image are generated as a resultant combination of a second original light component (i.e., a light component having the at least one of: the second illumination intensity, the second illumination wavelength) and a second parasitic light component (i.e., a second 2nd order light component).

It will be appreciated that at least one of: a location of each pixel in the first image and a location of the corresponding pixel in the second image, intrinsic parameters of the image sensor (for example, such as, an optical centre, a focal length, and the like of said image sensor), extrinsic properties of the image sensor (for example, such as, the field of view of the image sensor, a pose of the image sensor at a time of capturing the first image and the second image, and the like) is known.

Optionally, when calculating the measured differences between the pixel values of the pixels in the first image and the pixel values of the corresponding pixels in the second image, the at least one processor is configured to employ at least one of: an image processing algorithm, an image processing formula. Such image processing algorithms and formulas are well-known in the art. The measured differences are representative of a measured change in image intensity. As a reference example, the pixel value of a pixel in the first image may be A+A', wherein A is a contribution of the first original light component and A' is a contribution of the first parasitic light component, and the pixel value of a corresponding pixel in the second image may be B+B', wherein B is a contribution of the second original light component and B' is a contribution of the second parasitic light component. In such an example, the measured difference between the pixel values of the aforesaid pixels can be calculated as (B+B')−(A+A')=(B−A)+(B'−A'). Here, B−A is a measured difference between original light components and B'−A' is a measured difference between parasitic light components. In this way, the measured difference between the pixel values of the pixels in the first image and the pixel values of the corresponding pixels in the second image can be calculated in a pixel-by-pixel manner.

The expected differences in the pixel values between the first image and the second image are estimated based on actual values of different illumination conditions that were used to illuminate the field of view of the image sensor. The at least one of: the difference between the first illumination intensity and the second illumination intensity, the difference between the first illumination wavelength and the second illumination wavelength is used as to estimate the expected differences in the pixel values. According to inverse power law, the expected differences in the pixel values between the first image and the second image is proportional to a square root of at least one of: the difference between the first illumination intensity and the second illumination intensity, the difference between the first illumination wavelength and the second illumination wavelength, if all the light emanating from the object that is illuminated reaches the same pixel in the first image and the second image.

It will be appreciated that in the given image, the parasitic light component (i.e., a light component arising due to second harmonic of the metalens) is formed by light that is emanated from a different object than an intended object (due to spreading of light after a 2nd order focal plane of the metalens). The parasitic light component causes deviation from ideal power relation of the light received by a particular pixel in the first image and its corresponding pixel in the second image. Thus, when the measured differences between the pixel values of the pixels in the first image and the pixel values of the corresponding pixels in the second image do not match the expected differences, it is likely due to the parasitic light components in the first image and the second image. Continuing from the reference example, the expected difference in the pixel values of the pixels in the first image and the second image, is B−A. Therefore, the unexpected contribution arising from the parasitic light components in the first image and the second image is B'−A'. This contribution would beneficially be corrected by the at least one processor in the next processing step.

Notably, the deviation in the measured difference from the expected difference in the pixel values, if present, is due to the difference in illumination conditions when capturing different images and their different parasitic light components. This deviation can be understood to be a difference signal which represents an amount of non-ideal power difference in the different illumination conditions employed for capturing the different images.

Herein, the deviation is indicative of a contribution of the first parasitic light component at each pixel in the first image and of the second parasitic light component at a corresponding pixel in the second image (due to a fact that the parasitic light component and the original light component react differently to changes in the illumination conditions). The pixel values of the pixels in the given image are corrected to remove any visual artifact arising due to the given parasitic light component, in the given image. In this regard, correcting one of the first image and the second image may be sufficient, as the one of the first image and the second image may have been captured using a default illumination intensity and/or a default illumination wavelength employed for capturing images with the image sensor, while another of the first image and the second image may have been captured using a different illumination intensity and/or a different illumination wavelength as compared to the default illumination intensity and/or the default illumination wavelength.

Optionally, the pixel values of the pixels in the at least one: the first image, the second image, is corrected, by subtracting deviation in the measured differences from the expected differences, from the pixel values in the at least one: the first image, the second image. For example, when the first image and the second image are grayscale images, the expected difference in the pixel values between the first image and the second image may be approximately 0.06. However, the measured differences between the pixel values of the pixels in the first image and the pixel values of the corresponding pixels in the second image may be approximately 0.08. Hence, the deviation in the measured differences from the expected differences in the pixel values may be 0.02. So, 0.02 may be subtracted from the pixel values of the pixels in the at least one of: the first image, the second image.

Optionally, the pixel values are corrected using at least one neural network. A technical effect of correcting the pixel values using at least one neural network is that the at least one neural network can be trained to identify artifacts in multiple pairs of first images and second images, and then can be utilised to correct the identified artifacts automatically upon completion of said training, wherein the at least one neural network can be generalised to correct new images. Optionally, in this regard, the at least one processor is further configured to train the at least one neural network for correcting metalens-based camera images, using supervised learning. In this regard, the at least one neural network may previously be untrained or partially-trained, prior to said training. Optionally, when training the at least one neural network, the at least one processor is configured to: generate a training dataset, wherein the training dataset comprises images captured using a metalens-based camera and ground truth depth maps; and infer a meta non-ideality function based on the training dataset. The ground truth depth maps optionally comprise depth images and/or images captured using a non-metalens-based camera. This meta non-ideality function can optionally be applied to existing time-of-flight camera raw datasets to simulate metalens-based camera images. Such simulations can be performed for further training of the at least one neural network. Herein, the term "meta non-ideality function" refers to a mathematical function that describes a non-ideal behaviour of the metalens. Hence, when correcting the pixel values of the given image, the meta non-ideality function inferred upon the training of the at least one neural network, is used to remove non-ideality factors such as the given parasitic light component from the given image.

Optionally, an input of the at least one neural network comprises information indicative of the deviation in the measured differences from the expected differences in the pixel values and at least one of: the first image, the second image. Herein, by applying the deviation in the measured differences from the expected differences to the at least one of: the first image, the second image, the at least one neural network is able to compensate for metalens-based visual artifacts (i.e., artifacts due to 2nd order unfocused light) in the at least one of: the first image, the second image. In this regard, only image(s) that is/are to be corrected needs to be provided as the input. This also prevents overburdening of the at least one neural network by avoiding providing unnecessary images to it. In some implementations only the first image or the second image is provided as the input, whereas in other implementations, both the first image and the second image are provided as the input. The deviation in the measured differences from the expected differences indicates undesired pixel value contribution of the parasitic light component in the at least one of: the first image, the second image.

Alternatively, optionally, an input of the at least one neural network comprises the first image, the second image, and information indicative of the at least one of: the difference between the first illumination intensity and the second illumination intensity, the difference between the first illumination wavelength and the second illumination wavelength. In this regard, the at least one neural network calculates the measured differences between the pixel values of pixels in the first image and the pixel values of corresponding pixels in the second image, estimates the expected differences in the pixel values between the first image and the second image (based on the at least one of: the difference between the first illumination intensity and the second illumination intensity, the difference between the first illumination wavelength and the second illumination wavelength), and corrects the pixel values of the pixels in at least one: the first image, the second image, on its own. In this case, the at least one neural network beneficially performs all processing steps after capturing of the first image and the second image, thereby yielding better image correction results than when it only performs the step of correcting the pixel values. The information indicative of the at least one of: the difference between the first illumination intensity and the second illumination intensity, the difference between the first illumination wavelength and the second illumination wavelength, is used by the at least one neural network to estimate the expected differences in the pixel values between the first image and the second image. The at least one neural network corrects the pixel values of the pixels in the at least one of: the first image, the second image based on the deviation in the measured differences from the expected differences in the pixel values.

Optionally, the at least one neural network is any one of: a convolutional neural network (CNN), a generative adversarial network (GAN), an encoder-decoder generator network. An example of the convolutional neural network is UNet. Optionally, the at least one neural network comprises the encoder-decoder generator network with skip connections and residual neural network (ResNet) bottleneck layers, and a discriminator network. The skip connections symmetrically connect the elements in the encoder-decoder generator network with each other, by element-wise summation. In the encoder-decoder generator network, at least one of: the first image, the second image which is provided as input to the encoder-decoder generator network is compressed to a fraction of its original resolution, while simultaneously generating feature maps. The ResNet bottleneck layers are used to maintain a number of features in the feature maps. The discriminator network is used to classify a prediction generated by the encoder-decoder generator network. One such exemplary neural network that can be used for correcting the pixel values has been illustrated in conjunction with FIG. 4, for the sake of clarity.

It will be appreciated that an output of the at least one neural network depends on the input of the at least one neural network. In some instances, the output may require further post-processing, and thus sometimes post-processing operation(s) may be implemented. This is described in detail below.

Optionally, the pixel values of the pixels are corrected in a single post-processing operation comprising at least one of: dual frequency correction, denoising, phase unwrapping, lens distortion correction. In this regard, the single post-processing operation is applied to the pixel values of the pixels of the given image to correct the given image such that upon correction, the pixel values of the pixels of the given image include nil or minimal contribution from the parasitic light component. The single post-processing operation is applied in a single step, thereby beneficially simplifying the correction of the pixel values of the pixels of the given image, and reducing a time required for correcting the given image. A technical effect of correcting the pixel values of the pixels using the single post-processing operation is to improve an overall quality of the at least one: the first image, the second image, in a simple, processing-resource-efficient and time-efficient manner. The single post-processing operation eliminates problems such as error accumulation and information loss that occur in sequential multi-operation pipelines (wherein module can only observe an output from its direct predecessor, resulting in erroneous inferences). Each of the aforementioned examples of the single post-processing operation is described in detail below.

The "dual frequency correction" is an image processing operation that improves a quality of images captured by an image sensor by accounting for impact of environmental factors (for example, humidity, temperature, and similar), on measurement of light at a time of image capturing. Dual frequency correction operation is implemented using two different frequencies, wherein one frequency is used to measure a distance between the image sensor and an object being imaged while the other frequency is used to measure the impact of the environmental factors on measurement of light. Optionally, the dual frequency correction operation separates a true depth of phase wrapped candidates by measuring a correlation between different phase images at the two different frequencies. As a result, the pixel values of the pixels of the given image are corrected such that a maximum unambiguous depth range determined using the given image is extended. Moreover, depth estimate of phase measurements in the phase images wrap around, and the dual frequency correction is used for phase unwrapping while penalizing the artifacts in the depth images generated.

The "phase unwrapping" is an image processing operation that unwraps phase values in the phase images, which are typically wrapped within a range of 2n (n=pi), to obtain a true continuous phase shift between the phase images for correcting the phase images. This beneficially also leads to minimizing errors in subsequent distance measurement using the phase images. Phase unwrapping is typically done by identifying phase jumps or discontinuities in wrapped phase values in the phase images and adding or subtracting multiples of 2n to ensure that the phase values are continuous.

The "lens distortion correction", or multipath interference correction is a process of correcting any lens distortion that is commonly introduced while capturing the given image. In this regard, sparse reflections analysis technique is used to compensate for the lens distortion. Optionally, denoising is also performed when correcting the pixel values of the pixels. Denoising removes any noise or visual artifacts from the given image, thereby improving clarity and/or sharpness of the given image, while presenting important features of the given image. The denoising can be performed using the at least one neural network. One such at least one neural network using end-to-end image processing is described, for example, in "Deep End-to-End Time-of-Flight Imaging" by Shuochen Su, Felix Heide et al, published in IEEE/CVF conference on Computer Vision and Pattern Recognition, pp. 6383-6392, 18-23 Jun. 2018, which has been incorporated herein by reference.

The present disclosure also relates to the method as described above. Various embodiments and variants disclosed above, with respect to the aforementioned imaging system, apply mutatis mutandis to the method.

Optionally, the pixel values are corrected using at least one neural network. Optionally, an input of the at least one neural network comprises information indicative of the deviation in the measured differences from the expected differences in the pixel values and at least one of: the first image, the second image. Alternatively, optionally, an input of the at least one neural network comprises the first image, the second image, and information indicative of the at least one of: the difference between the first illumination intensity and the second illumination intensity, the difference between the first illumination wavelength and the second illumination wavelength.

Optionally, the pixel values of the pixels are corrected in a single post-processing operation comprising at least one of: dual frequency correction, denoising, phase unwrapping, lens distortion correction.

Optionally, the first image and the second image are at least one of: phase images, correlation images, depth images.

Optionally, the controllable light source, the image sensor and the metalens constitute a metalens-based time-of-flight camera.

DETAILED DESCRIPTION OF THE DRAWINGS

Figure 2:
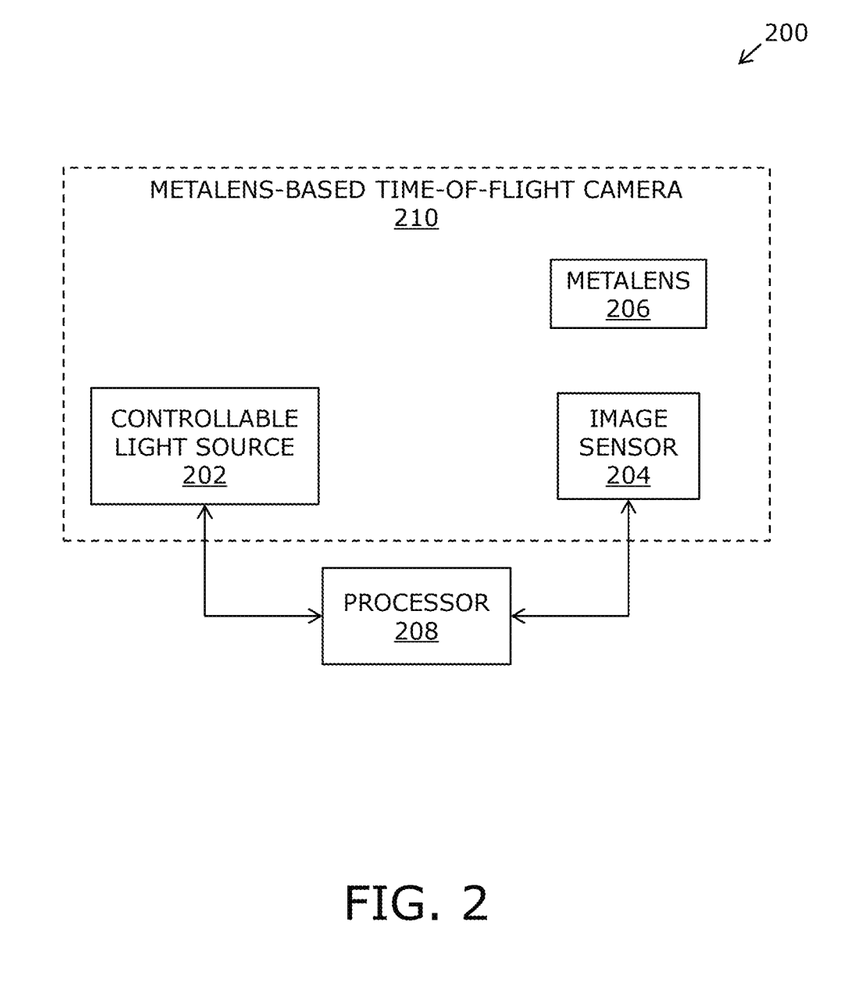
FIG. 2 illustrates block diagram of an architecture of an imaging system, in accordance with an embodiment of the present disclosure.

Referring to FIG. 2, there are shown illustrations of a block diagram of an architecture of an imaging system 200, in accordance with an embodiment of the present disclosure. The imaging system comprises a controllable light source 202, an image sensor 204, a metalens 206, at least one processor (depicted as a processor 208). The processor 208 is communicably coupled to the controllable light source 202 and the image sensor 204. The metalens 206 is employed to focus incoming light onto the image sensor 204. The processor 208 is configured to perform the aforementioned operations, as described earlier. Optionally, the controllable light source 202, the image sensor 204 and the metalens 206 constitute a metalens-based time-of-flight camera 210.

It may be understood by a person skilled in the art that FIG. 2 includes a simplified architecture of the imaging system 200, for sake of clarity, which should not unduly limit the scope of the claims herein. It is to be understood that the specific implementation of the imaging system 200 is provided as an example and is not to be construed as limiting it to specific numbers or types of controllable light sources, image sensors, and metalenses. The person skilled in the art will recognize many variations, alternatives, and modifications of embodiments of the present disclosure.

Figure 3A:
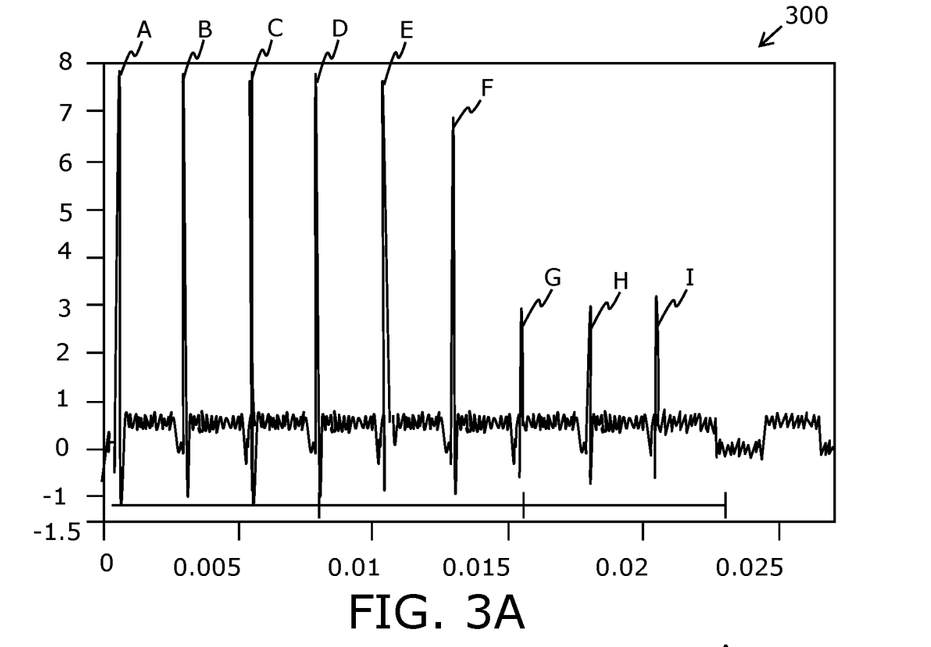
Figure 3B:
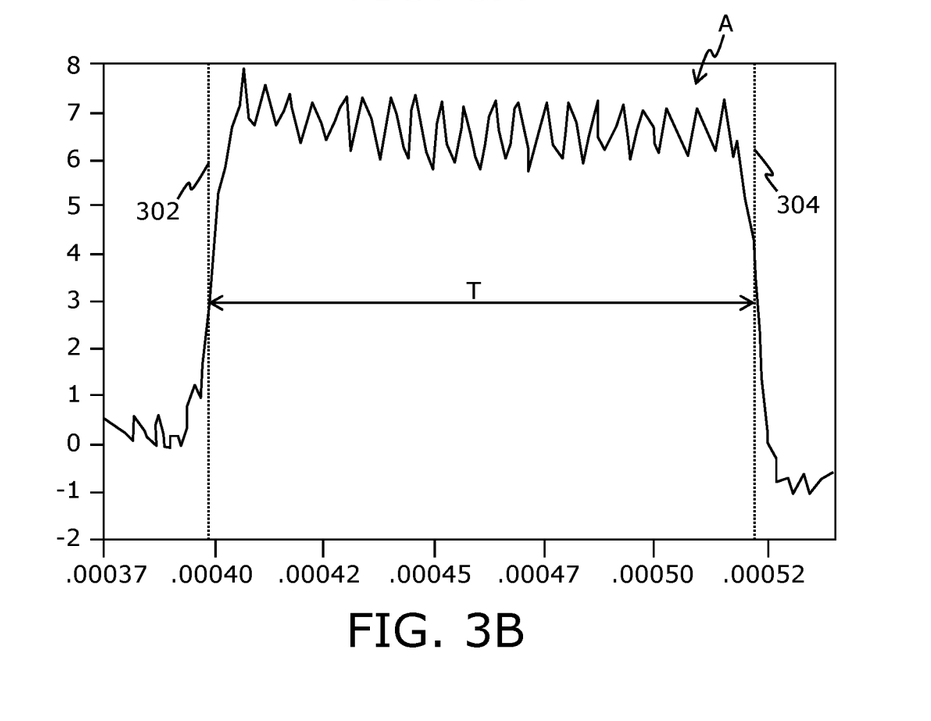
FIG. 3B illustrates a zoomed-in view of a portion of the exemplary graphical representation of FIG. 3A, in accordance with an embodiment of the present disclosure.

Referring to FIGS. 3A and 3B, in FIG. 3A there is illustrated an exemplary graphical representation 300 of capturing of phase images by an image sensor, while in FIG. 3B there is illustrated a zoomed-in view of a portion of the exemplary graphical representation 300 of FIG. 3A, in accordance with an embodiment of the present disclosure. The graphical representation 300 is in the form of a graph whose horizontal axis represents time in seconds, and vertical axis represents amplitude in watts. When a phase image is captured by the image sensor, there is a spike in amplitude. Herein, in FIG. 3A, nine spikes A, B, C, D, E, F, G, H, and I represent capturing of nine phase images. The nine phase images A-I are captured at different frequency modes. Herein, capturing of the phase images shown by the spikes A-C is performed at a high frequency mode, capturing of the phase images shown by the spikes D-F is performed at a medium frequency mode, and capturing of the phase images shown by the spikes G-I is performed at a low frequency mode. When capturing the phase images, the amplitude is shown to decrease with a decrease in frequency. The portion of the exemplary graphical representation 300 which represents the spike A is shown in the zoomed-in view of FIG. 3B, for sake of clarity. Herein, a time interval T between a rise (as depicted by a line 302) and fall (as depicted by a line 304) of the spike A is an integration time.

FIGS. 3A-3B are merely an example, which should not unduly limit the scope of the claims herein. A person skilled in the art will recognize many variations, alternatives, and modifications of embodiments of the present disclosure.

Figure 4:
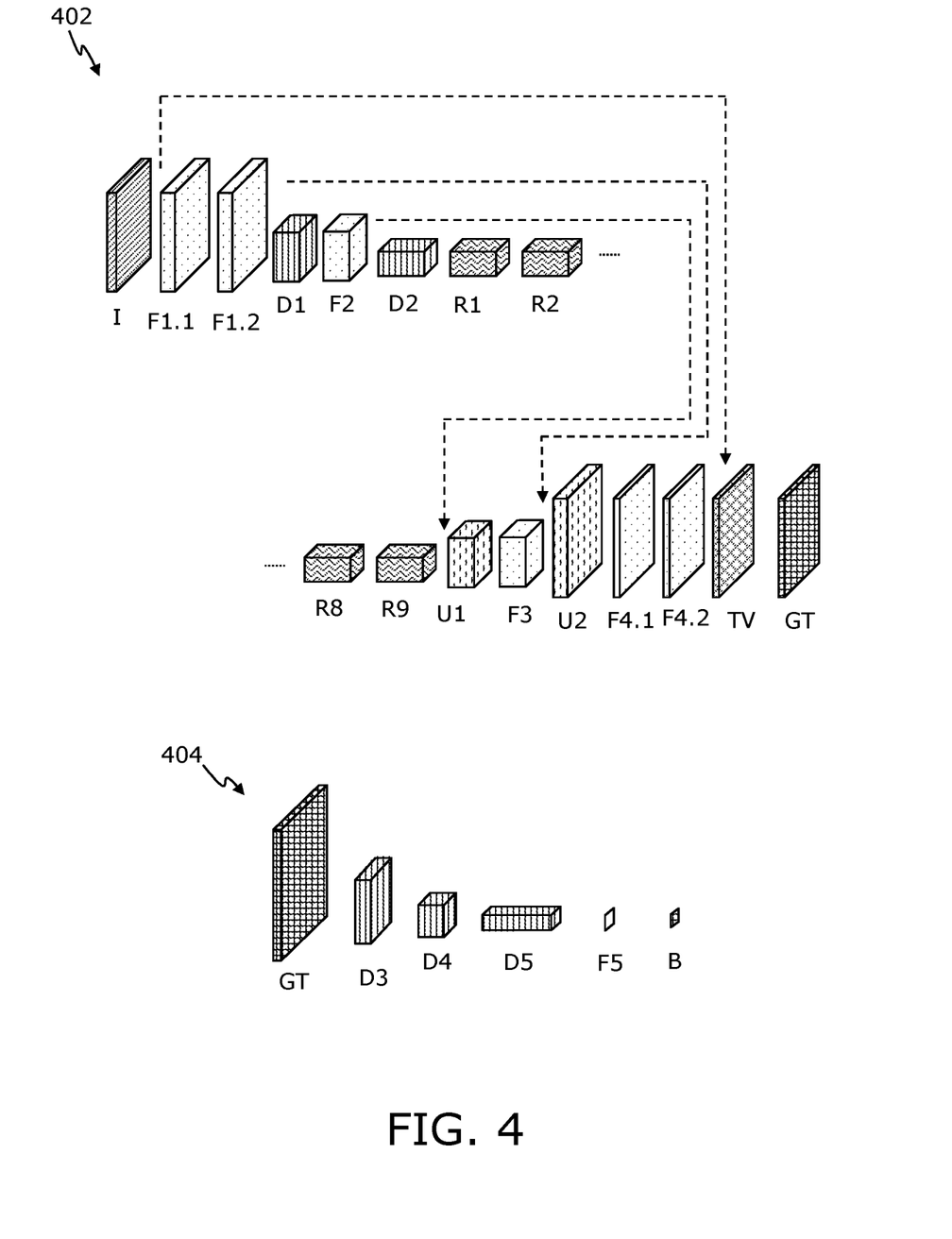
FIG. 4 illustrates a block representation of an exemplary neural network that is used to correct pixel values, in accordance with an embodiment of the present disclosure.

Referring to FIG. 4, there is illustrated a block representation 400 of an exemplary neural network that is used to correct pixel values, in accordance with an embodiment of the present disclosure. The neural network comprises an encoder-decoder generator network 402 with skip connections (as depicted by small-dashed lines) and residual neural network (ResNet) bottleneck layers, and a discriminator network 404. The encoder-decoder generator network 402 comprises an input block I, two first flat-convolution blocks F1.1 and F1.2, a first down-convolution block D1, a second flat-convolution block F2, a second down-convolution block D2, a first residual network (ResNet) block R1, a second ResNet block R2, and so on up to a ninth ResNet block R9, a first up-convolution block U1, a third flat-convolution block F3, a second up-convolution block U2, two fourth flat-convolution blocks F4.1 and F4.2, a total variation block TV, and a prediction block GT. Herein, different types of blocks are shown using different hatched patterns. Moreover, the skip connections symmetrically connect the first flat-convolution block F1.1 to the total variation block TV, one of the two first flat-convolution blocks F1.2 to the second up-convolution block U2 and the second flat-convolution block F2 to the first up-convolution block U1, by element-wise summation. The discriminator network 404 comprises the prediction block GT, a third down-convolution block D3, a fourth down-convolution block D4, a fifth down-convolution block D5, a fifth flat-convolution block F5, and a binary block B. In the encoder-decoder generator network 402, an image (i.e., a first image and/or a second image) provided to the input block I may be compressed to a fraction of its original resolution, while simultaneously generating feature maps. The ResNet blocks R1-R9 are used to maintain a number of features in the feature maps. The discriminator network 404 is used to classify a prediction generated by the encoder-decoder generator network 402. In an embodiment, the input block I is provided information indicative of a deviation in measured differences from expected differences in pixel values of pixels in the first image and the second image. In another embodiment, the input block I is provided information indicative of at least one of: a difference between a first illumination intensity and a second illumination intensity, a difference between a first illumination wavelength and a second illumination wavelength.

FIG. 4 is merely an example, which should not unduly limit the scope of the claims herein. A person skilled in the art will recognize many variations, alternatives, and modifications of embodiments of the present disclosure. For example, the neural network may have a different number of blocks and/or a different arrangement of the blocks, the different blocks of the neural network may have various dimensions, different skip connections, and similar.

Figure 5:
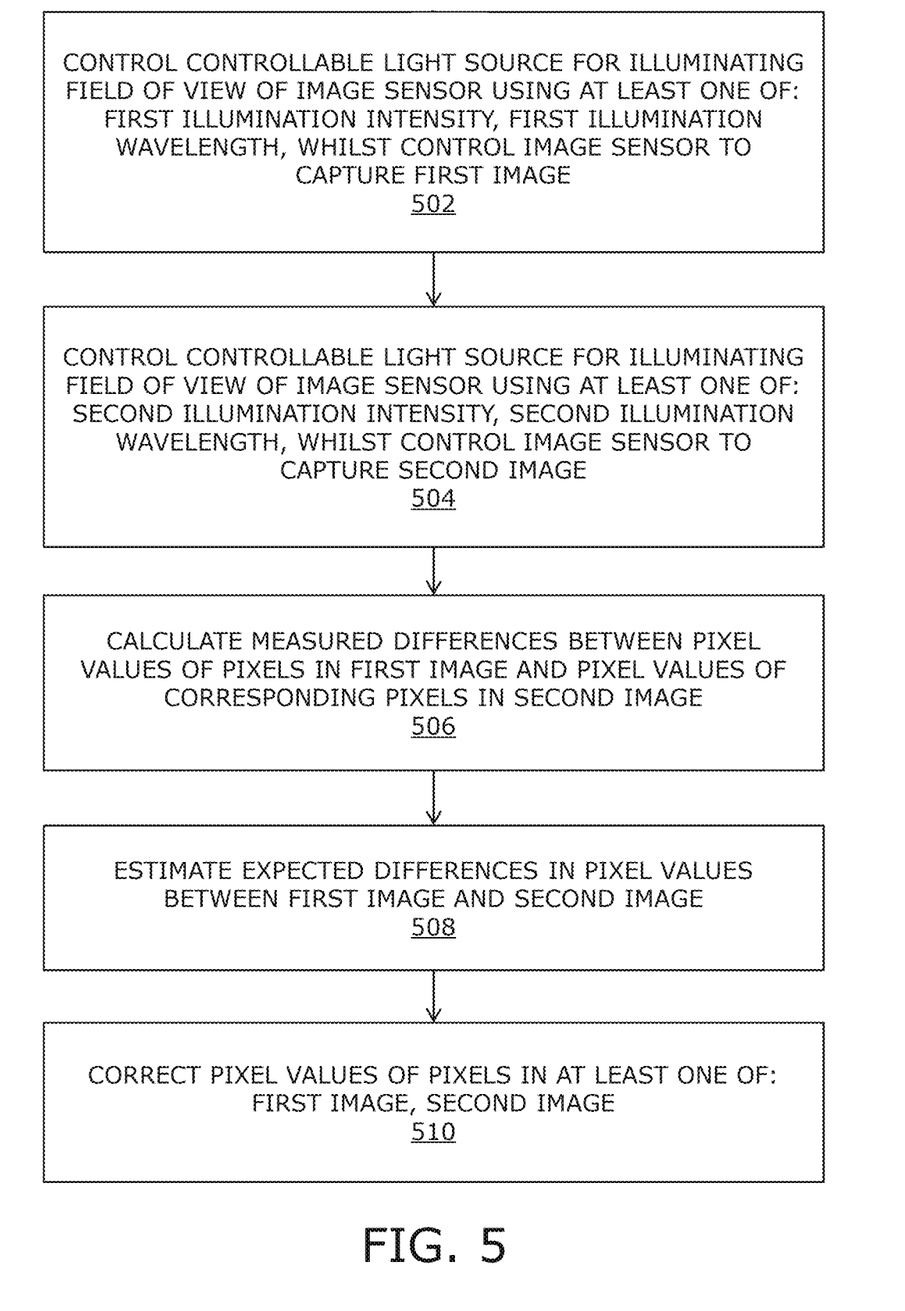
FIG. 5 illustrates steps of a method for imaging, in accordance with an embodiment of the present disclosure.

Referring to FIG. 5, illustrated are steps of a method for imaging, in accordance with an embodiment of the present disclosure. The method is implemented by an imaging system comprising a controllable light source, an image sensor, a metalens that is to be employed to focus incoming light onto the image sensor and at least one processor. At step 502, a controllable light source is controlled for illuminating a field of view of an image sensor using at least one of: a first illumination intensity, a first illumination wavelength, whilst the image sensor is controlled to capture a first image. At step 504, the controllable light source is controlled for illuminating the field of view of the image sensor using at least one of: a second illumination intensity, a second illumination wavelength, whilst the image sensor is controlled to capture a second image. At step 506, measured differences between pixel values of pixels in the first image and pixel values of corresponding pixels in the second image, are calculated. At step 508, expected differences in the pixel values between the first image and the second image, are estimated, based on at least one of: a difference between the first illumination intensity and the second illumination intensity, a difference between the first illumination wavelength and the second illumination wavelength. At step 510, the pixel values of the pixels in at least one of: the first image, the second image are corrected, based on a deviation in the measured differences from the expected differences in the pixel values.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An imaging system comprising:
 a controllable light source;
 an image sensor;
 a metalens configured to focus incoming light onto the image sensor; and
 at least one processor configured to:
  control the controllable light source to illuminate a field of view of the image sensor using at least one of: a first illumination intensity, a first illumination wavelength, while controlling the image sensor to capture a first image;
  control the controllable light source to illuminate the field of view of the image sensor using at least one of: a second illumination intensity, a second illumination wavelength, while controlling the image sensor to capture a second image;
  calculate measured differences between pixel values of pixels in the first image and pixel values of corresponding pixels in the second image;
  estimate expected differences in the pixel values between the first image and the second image, based on at least one of: a difference between the first illumination intensity and the second illumination intensity, a difference between the first illumination wavelength and the second illumination wavelength; and
  correct the pixel values of the pixels in at least one of: the first image, the second image, based on a deviation in the measured differences from the expected differences in the pixel values.

2. The imaging system of claim 1, wherein the pixel values are corrected using at least one neural network.

3. The imaging system of claim 2, wherein an input of the at least one neural network comprises information indicative of the deviation in the measured differences from the expected differences in the pixel values and at least one of: the first image, the second image.

4. The imaging system of claim 2, wherein an input of the at least one neural network comprises the first image, the second image, and information indicative of the at least one of: the difference between the first illumination intensity and the second illumination intensity, the difference between the first illumination wavelength and the second illumination wavelength.

5. The imaging system of claim 1, wherein the pixel values of the pixels are corrected in a single post-processing operation comprising at least one of: dual frequency correction, denoising, phase unwrapping, lens distortion correction.

6. The imaging system of claim 1, wherein the first image and the second image are at least one of: phase images, correlation images, depth images.

7. The imaging system of claim 1, wherein the controllable light source, the image sensor and the metalens constitute a metalens-based time-of-flight camera.

8. A method for imaging, the method being implemented by an imaging system comprising a controllable light source, an image sensor, and a metalens that is configured to focus incoming light onto the image sensor, the method comprising:
 controlling the controllable light source for illuminating a field of view of the image sensor using at least one of: a first illumination intensity, a first illumination wavelength, while controlling the image sensor to capture a first image;
 controlling the controllable light source for illuminating the field of view of the image sensor using at least one of: a second illumination intensity, a second illumination wavelength, while controlling the image sensor to capture a second image;
 calculating measured differences between pixel values of pixels in the first image and pixel values of corresponding pixels in the second image;
 estimating expected differences in the pixel values between the first image and the second image, based on at least one of: a difference between the first illumination intensity and the second illumination intensity, a difference between the first illumination wavelength and the second illumination wavelength; and
 correcting the pixel values of the pixels in at least one of: the first image, the second image, based on a deviation in the measured differences from the expected differences in the pixel values.

9. The method of claim 8, wherein the pixel values are corrected using at least one neural network.

10. The method of claim 9, wherein an input of the at least one neural network comprises information indicative of the deviation in the measured differences from the expected differences in the pixel values and at least one of: the first image, the second image.

11. The method of claim 9, wherein an input of the at least one neural network comprises the first image, the second image, and information indicative of the at least one of: the difference between the first illumination intensity and the second illumination intensity, the difference between the first illumination wavelength and the second illumination wavelength.

12. The method of claim 8, wherein the pixel values of the pixels are corrected in a single post-processing operation comprising at least one of: dual frequency correction, denoising, phase unwrapping, lens distortion correction.

13. The method of claim 8, wherein the first image and the second image are at least one of: phase images, correlation images, depth images.

14. The method of claim 8, wherein the controllable light source, the image sensor and the metalens constitute a metalens-based time-of-flight camera.

* * * * *